R. LA FRANCE.
LEER CHARGING DEVICE.
APPLICATION FILED SEPT. 15, 1913.

1,296,818.

Patented Mar. 11, 1919.
7 SHEETS—SHEET 7.

Witnesses
W. K. Ford
James P. Barry

Inventor
Richard LaFrance
By Whitmore Hulbert Whitmore
Attys

UNITED STATES PATENT OFFICE.

RICHARD LA FRANCE, OF TOLEDO, OHIO, ASSIGNOR TO THE TOLEDO GLASS COMPANY, OF TOLEDO, OHIO, A CORPORATION OF OHIO.

LEER-CHARGING DEVICE.

1,296,818.      Specification of Letters Patent.      Patented Mar. 11, 1919.

Application filed September 15, 1913. Serial No. 789,779.

*To all whom it may concern:*

Be it known that I, RICHARD LA FRANCE, a citizen of the United States of America, residing at Toledo, in the county of Lucas and State of Ohio, have invented certain new and useful Improvements in Leer-Charging Devices, of which the following is a specification, reference being had therein to the accompanying drawings.

This invention relates to improvements in apparatus for transferring glassware to leers. The mechanism herein shown is intended to be used particularly for taking the glassware, such as bottles or other similar ware, as the same are delivered from a blowing or forming machine, and depositing them in rows upon the leer carrier. I have shown an apparatus designed particularly for taking bottles from such a machine as shown in the patent to W. E. Bock, No. 870,664, dated November 12, 1907, in which the bottles are dropped out from the blow-mold ready for annealing, one-by-one, and as they are dropped they are formed into rows adjacent to the leer-carrier and then transferred from a horizontal position to a vertical position upon the leer-carrier. The invention consists in mechanism for arranging the bottles in rows and transferring the rows to the leer, and in the construction, combination and arrangement of parts hereinafter described and more particularly pointed out in the claims.

In the drawings: Figure 1 is a plan view of the mechanism as an entirety, with part of the transverse carrier removed, showing more clearly the parts beneath; Fig. 1ᴬ is a view illustrating the mold of the blowing machine and the chute for delivering the bottles to the holder of the feed-carrier;

Figures 1, 1A:
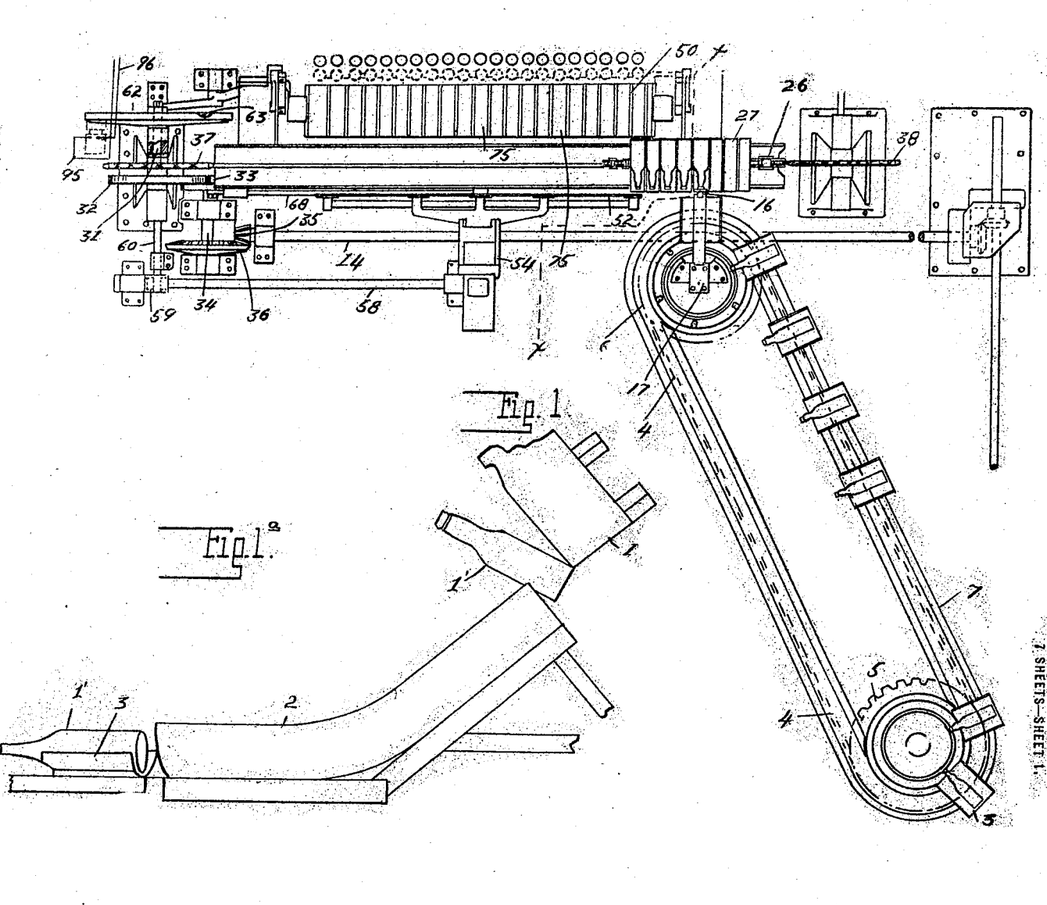
Figure 2:
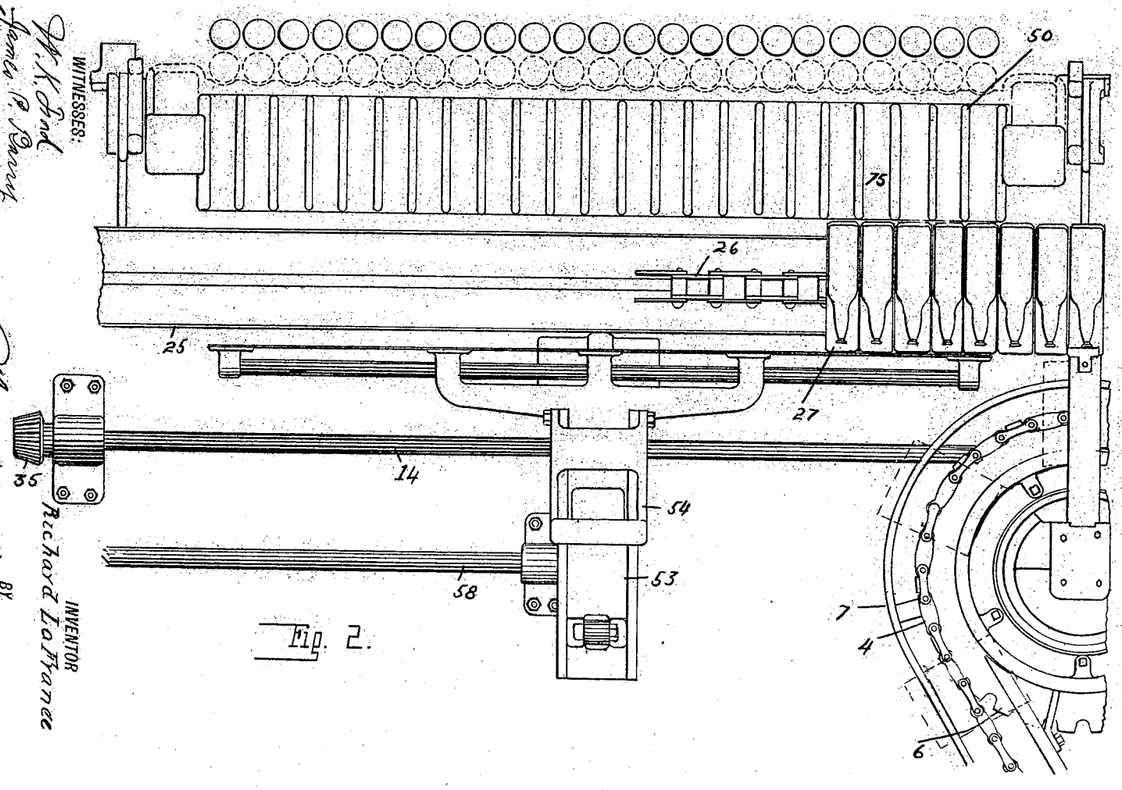
Fig. 2 is an enlarged plan of a portion of Fig. 1, with a section of the transverse carrier removed.
Figure 3:
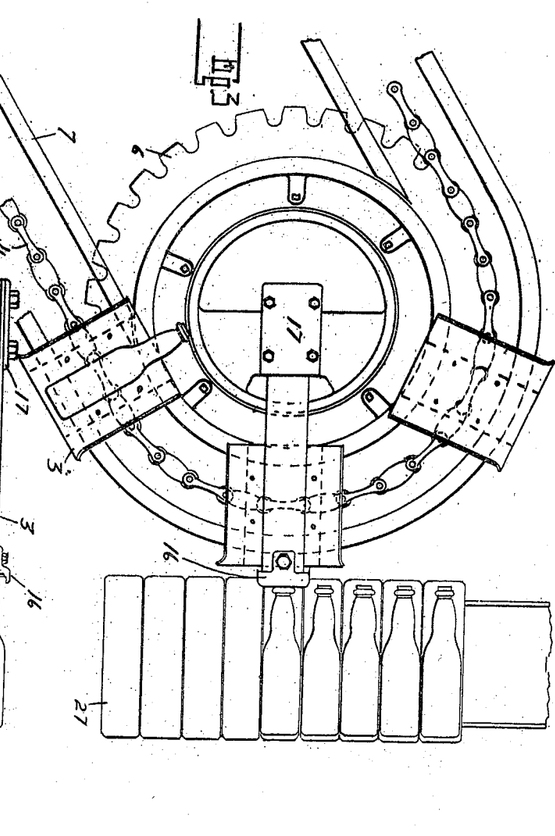
Fig. 3 is an enlarged plan of the discharge end of the feed-carrier and a portion of the transverse carrier.
Figure 4:
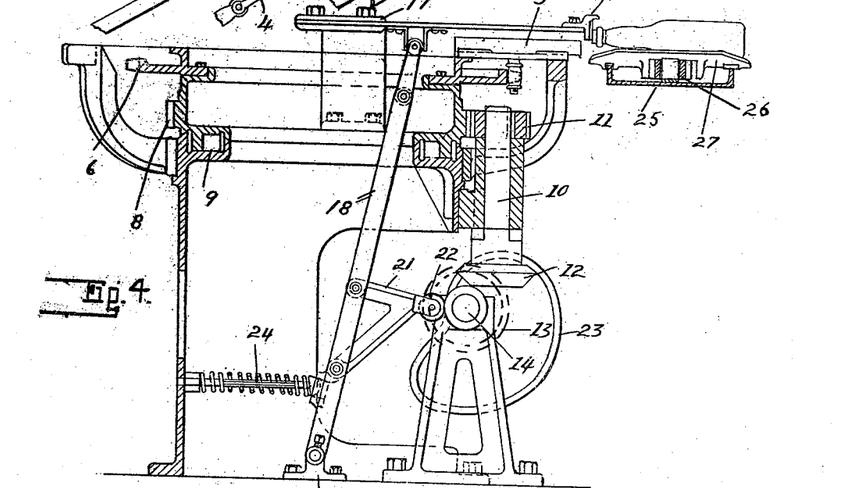
Fig. 4 is a vertical central section through the middle of the feed-carrier sprocket-wheels shown in Fig. 3.

I have indicated at 1, the blow-mold of a blowing machine of the type described, showing a bottle, 1', about to be discharged therefrom upon an inclined chute, 2, and by gravity this bottle will be projected from the chute onto a concave holder, 3, on an endless chain, 4, which runs around the horizontal sprocket-wheels, 5, 6, supported upon suitable frame-work. The length of this chain and its arrangement in relation to the rest of the mechanism depends upon the location of the blow-machine in relation to the leer. The sprocket-chain is provided with guide-ways, 7, upon which the holders 3 run, this guide-way being curved at the ends, as shown. The sprocket-wheel 5 is an idle wheel, but the sprocket-wheel 6 has secured to its underface a gear-wheel, 8, (Fig. 4), the sprocket-wheel and gear-wheel being of ring-shape and journaled in a bearing 9, of the frame.

Adjacent to the gear-wheel 8 is a vertical shaft, 10, having at its upper end a pinion, 11, and at its lower end a gear-wheel, 12, which is driven by a beveled pinion, 13, on a shaft, 14, which is preferably driven by the drive mechanism of the blowing machine so as to be timed therewith. This drive connection is not shown as it may be any suitable construction.

In order to remove the bottles from the holders 3 and arrange them in rows, I employ a pusher, 16, supported in a guide, 17, on the frame of the machine and actuated by a lever, 18, arranged within the ring-shaped sprocket-wheel and gear-wheel and journaled at its lower end on a bracket, 20. This lever is provided with a side-bracket, 21, carrying a roller, 22, which bears against a cam 23, on the shaft 14; this cam being arranged so that as each holder, 3, comes opposite the pusher 16 the cam will permit a spring-pressed pusher, 24, to move the lever forward and push the bottle off of the holder 3, and then the cam will move it backward ready for the next operation.

Beside the delivery point of the pusher 16 is arranged a horizontal guide-way, 25, over which runs an endless chain, 26, bearing upon it the holders, 27, arranged in close proximity so that the bottles pushed off by the pusher 16 will be arranged in a row across the end of the leer; the longitudinal axis of the leer being at right-angles with the endless chain 26. This endless chain 26 extends to opposite sides of the leer 20 and at its ends passes over sprocket-wheels 37, 38, the sprocket-wheel 38 being an idler and the sprocket-wheel 37, being the driven wheel, is secured to its shaft 31 upon which is secured the gear-wheel, 32, driven by a pinion, 33, on a shaft, 34, which receives motion from the shaft 14 through a beveled pinion, 35, and beveled gear-wheel, 36.

Figures 9, 10:
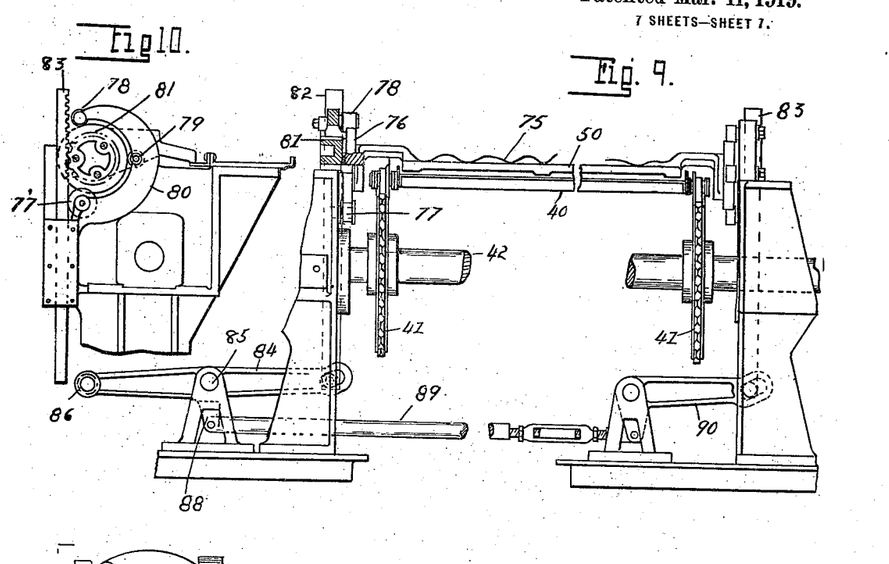
Fig. 9 is a longitudinal sectional elevation illustrative of the construction of the tilting-frame.
Fig. 10 is an end elevation of the support for the tilting-frame, looking from the right-hand end of Fig. 9.

40 is an endless carrier made up of separated plates, each of a length substantially equal to the width of the leer and forming the leer carrier; these plates being supported upon suitable guides in the leer (not shown) and connected together by a sprocket-chain passing over sprocket-wheels 41 (indicated in Figs. 6 and 9 and in dotted lines in Fig. 5) upon a transverse shaft, 42.

Figure 5:
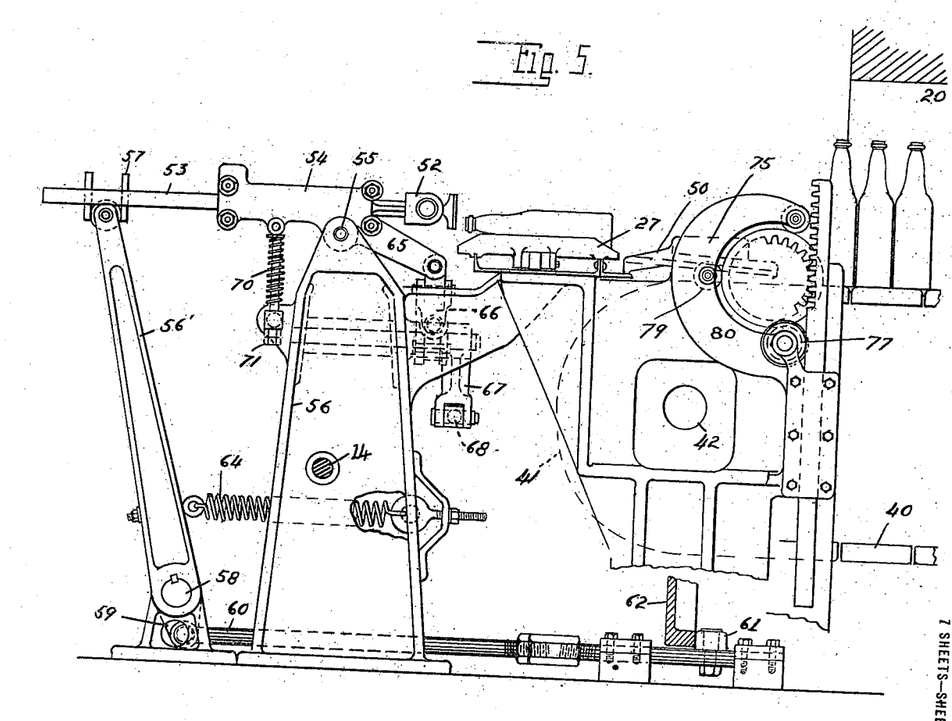
Fig. 5 is a section on the zig-zag line $x$—$x$ of Fig. 1.
Figure 6:
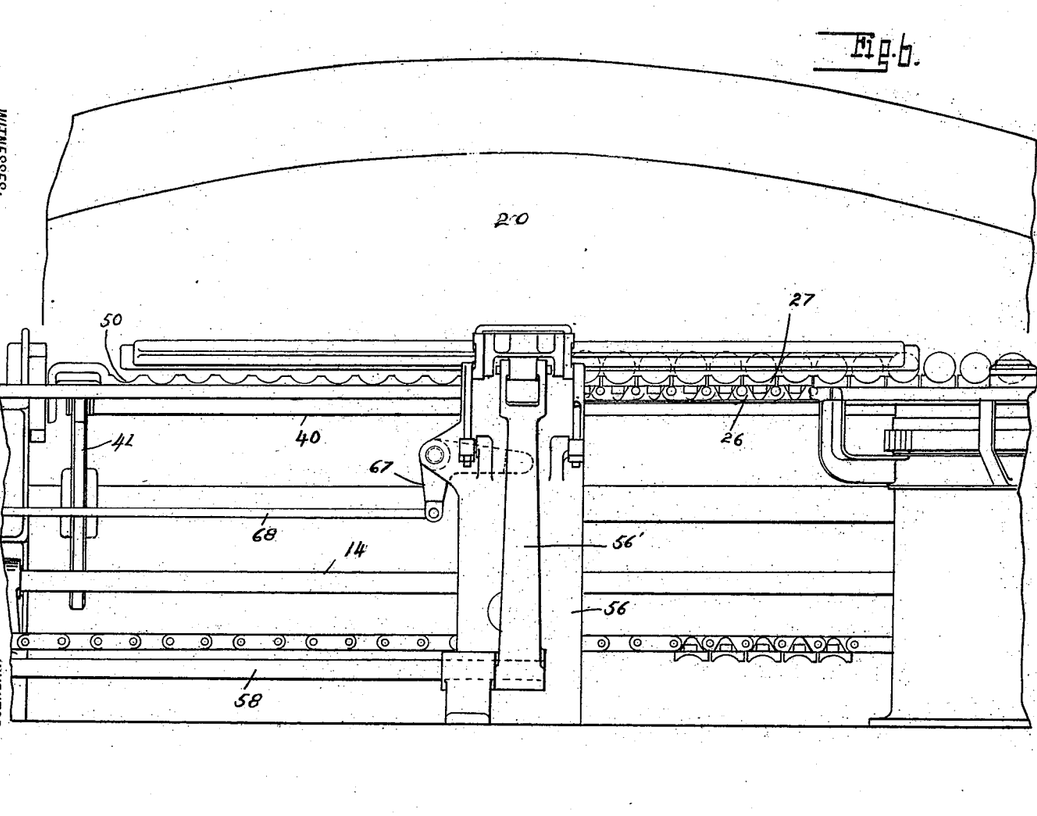
Fig. 6 is a front elevation of the mechanism shown in Fig. 2, with the left-hand portion of the transverse carrier removed.

By reference to Fig. 5, it will be seen that the chain 26 and holders 27 are in proximity to but beyond the end of the leer carrier 40 which passes over the sproket-wheels 41. When a sufficient number of bottles have been pushed by the pusher 16 upon the holders 27 of the chain 26 to form a row of the width of the leer carrier, they are pushed from the holders 27 upon a rocking frame, 50, which I designate an "uprighter" as it turns the bottles from horizontal to upright position and deposits them upon the leer.

Figure 7:
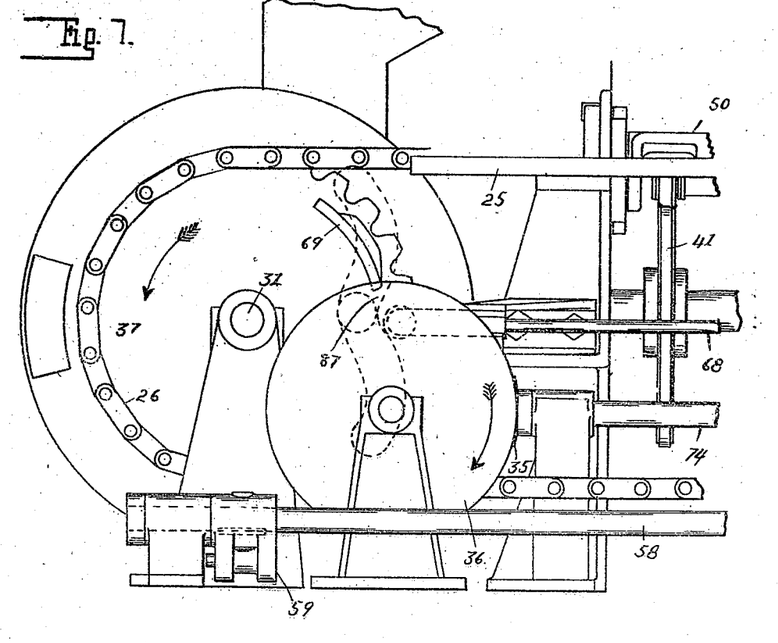
Fig. 7 is a front elevation of the operating mechanism at the left-hand end of Fig. 1.
Figure 8:
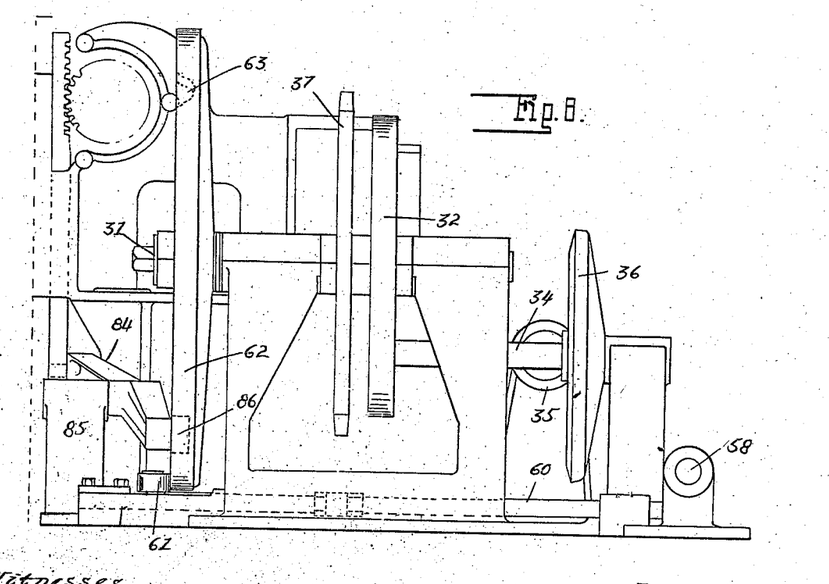
Fig. 8 is an end elevation of the feed mechanism, looking from the left-hand of Fig. 1.

The transferring device, or pusher, which moves the bottles from the holders 27 to the uprighter, comprises a head, 52 (Fig. 5), carried by arms, 53, sliding in guideways 54. These guide-ways are pivoted at 55 upon the standard, 56, of the frame. The head 52 is reciprocated by a lever, 56', having a roller at its upper end engaging between the vertical guides, 57, on the slide 53; this slide being bifurcated, or apertured, to permit the roller to pass through it when the slides are rocked, as will be shortly described. The lever 56' is secured to a shaft, 58, which extends to the end of the machine and is provided on its under side with a rock-arm, 59, (Fig. 7), to the end of which a slide-bar, 60, is secured. This slide-bar extends in suitable guides across the frame of the machine and is provided with a roller, 61 (Fig. 8), on its upper face, arranged beside a cam-wheel, 62, and secured to the shaft 31. This cam-wheel is provided with an indented cam-way, 63, into which the roller 61 may engage, thus rocking the shaft 58 and the lever 56 and moving the head 52 toward the leer, pushing off the row of bottles from the holders 27 upon the uprighter. This forward movement of the head 52 is produced by a spring, 64, secured to the lever and to a part of the machine. The cam-way of the roller 61 is shaped to rapidly return the pusher to its initial position by a reverse movement of the roller.

On the return movement of the head 52, in order that the incoming bottles or ware fed off by the lever 18 may not strike the head or pusher 52, that head or pusher is tilted or lifted out of the path of the bottles. This tilting movement is permitted by the fact that the guide is pivoted at 55, as before described, and is accomplished by means of an arm, 65, secured to the guide 54 and by a link, 66, to a bell-crank lever, 67, one arm of which is connected to the link and the other arm to a push-rod, 68, which push-rod extends to the end of the machine and is provided at its end with a roller adapted to be struck and actuated by a cam, 69, on the side of the sprocket-wheel 37. As soon as the push-rod has passed over the cam, the pusher-head 52 is returned to its normal position in line with the bottles on the holders 27, by a spring, 70, sleeved upon a pin, 71, sliding in pivoted bearings on the frame and connected by a pivoted joint at its upper end to the guide 54; it being obvious that the tilting movement of this head is permitted in relation to the lever 18 by the fact that the roller at the upper end of the lever passes between the vertical guides 57 in the slide 53.

The delivery of the bottles from the uprighter to the leer-carrier is effected by moving the uprighter from horizontal to vertical position about its pivot, the uprighter being located over the horizontal portion of the leer-carrier. The uprighter frame, 50, is provided with suitable concave seats, 75, which prevent the bottles from rolling sidewise, and at its end it is provided with disks, 76, supported on rollers, 77, 78 and 79, these rollers being supported in a bracket, 80, on the frame at each end. Secured to the side of the disks are pinions, 81, with which mesh vertical rack-bars, 82, 83. The rack-bar 82, at the left-hand end of the leer (looking toward the leer) is connected at its lower end with a lever, 84, journaled on a bracket, 85, at the base of the machine, and at its opposite end having a rollengaging a cam-way, 87, on the inner face of the cam-wheel 62. On the lever 84 is a lever-arm, 88 (Fig. 9), which is connected by a connecting-rod, 89, with a bell-crank lever, 90, at the other end of the machine, one arm of this bell-crank lever being connected to the lower end of the rack-bar 83. By the connections described, as the cam-wheel 62 rotates, at the proper time in its rotation and after the uprighter has been charged with a row of bottles, the uprighter frame is turned about its pivot, from horizontal to vertical position, moving the bottles with it so that they rest upon the leer-pan, as clearly shown in Fig. 5. The uprighter is then returned to its horizontal position, ready for another charge of bottles.

The leer-carrier is moved forward by any suitable mechanism, timed with the feeding mechanism I have described. I preferably provide a shoe (not shown) on the cam-wheel 62, which, at the proper time in the revolution of the wheel, will close the circuit and set in motion a motor for driving the leer-carrier the distance of one row of bottles, with the necessary space between, and will then break the circuit and the motor will stop. This driving motor and electric switch is of the usual and ordinary construction and I do not deem it necessary to show the same; but I have shown, as indicated at 95, 96, a switch and circuit wires from the switch to the motor.

The parts being thus constructed, the operation of the described parts will bring the bottles to and upon the holders 27 of the endless carrier 26 across the end of the leer, until a complete row of bottles have been placed thereon. At this time the pusher-head 52 will push the bottles from the holders 27 upon the uprighter-frame 50 which will then be turned upon its pivot, moving the bottles from horizontal to vertical position upon the leer-carrier; the uprighter being then returned to its normal position, ready for another charge.

It is obvious that the chute 2 may deliver the bottles directly upon the holders 27 of the endless chain 26, provided the blowing machine is arranged in the proper relation to the carrier. In this case, the bottle holders 3, the carrier 4 and the transfer mechanism for pushing the bottles from the holders 3 to the holders 27, could be omitted.

What I claim as my invention is:

1. The combination with a leer-carrier of a pivoted frame arranged over the end thereof, adapted to hold a row of glass articles, means for feeding a row of articles thereon, and means for tilting the frame to discharge the articles upon the leer-carrier.

2. The combination with a leer-carrier of a pivoted frame arranged over the end of the leer-carrier, a transverse carrier adjacent to and parallel with the pivoted frame, holders thereon adapted to hold a row of bottles, means for transferring the bottles from the transverse carrier to the pivoted frame, and means for tilting the frame to discharge the bottles upon the leer-carrier.

3. The combination of a leer-carrier, a pivoted frame across and over the end thereof, pinions secured to the tilting frame, rack-bars engaging the pinions, and means for actuating the rack-bars to tilt the frame for the purpose described.

4. The combination of a leer-carrier, a tilting frame pivoted across and above the rear end thereof, a transverse carrier having a flight parallel with and adjacent the end of the tilting frame, a row of ware-holders on the frame, a pusher adapted to move a charge of the ware from the transverse carrier upon the tilting frame, and means for tilting the frame to discharge the ware upon the leer-carrier.

5. The combination of a horizontal carrier, 4, having ware-holders thereon, a transverse carrier having complementary ware-holders thereon, arranged across a leer-carrier, a reciprocating pusher for moving the bottles from the first-mentioned carrier to the transverse carrier, a tilting frame over the end of the leer-carrier, and a pusher for moving a row of the ware from the transverse carrier upon the tilting frame.

6. In a leer-charging apparatus the combination with the horizontal feed carrier having ware holders thereon of the ring-shaped sprocket wheel 6 around which said feed carrier passes, a pusher lever for moving the ware from the holders of the feed carrier, arranged within the ring-shaped sprocket-wheel, the leer carrier, and means for feeding the ware to the leer carrier.

7. In a leer charging apparatus the combination of the frame, the ring-shaped sprocket wheel 6, the feed carrier passing around the same, the gear wheel 8 secured to the ring-shaped sprocket wheel, a drive pinion engaging the same, a reciprocating pusher lever within the ring-shaped sprocket wheel, a leer carrier, and means for feeding the ware to the leer carrier.

8. In a leer-charging apparatus, the combination of a leer carrier adapted to move longitudinally of the leer tunnel, a sprocket wheel adjacent but separated from the leer carrier, a ware-carrier passing around said wheel, a transverse carrier adjacent the wheel, means for moving the ware from the ware-carrier to the transverse carrier, a tilting frame beside the transverse carrier and over the receiving end of the leer carrier, means for moving the ware from the transverse carrier onto the tilting frame and for tilting the frame.

9. In a leer charging apparatus, the combination with a leer carrier of an endless feed carrier having longitudinal ware supports, a sprocket wheel around which the carrier passes, said wheel being located at one side of the receiving end of the leer-carrier, a radial pusher for feeding ware off the endless feed carrier, and means for receiving the ware thus pushed off and for feeding it in rows upon the receiving end of the leer carrier.

10. In a leer charging apparatus, the combination of an endless carrier having horizontal ware supports, a ring-shaped sprocket-wheel around which the carrier passes, a receiving-carrier adjacent the ring-shaped sprocket-wheel and a pushing device within the ring shaped sprocket-wheel for pushing the ware from the holders on the endless carrier upon the receiving carrier, and means for transferring the ware from the receiving-carrier to the leer-carrier.

11. The combination with a leer carrier, a movable frame positioned across and over the end thereof, and means for causing a movement of said frame to tilt the latter for the purpose described.

In testimony whereof I affix my signature in presence of two witnesses.

RICHARD LA FRANCE.

Witnesses:
T. H. MILLER,
K. F. RISSER.